(12) United States Patent
Otto-Lübker et al.

(10) Patent No.: US 6,539,893 B1
(45) Date of Patent: Apr. 1, 2003

(54) DEVICE FOR PROVIDING FOOD TO ANIMALS

(75) Inventors: Friedrich Otto-Lübker, Badbergen-Vehs (DE); Arno Reinke, Goldenstedt (DE)

(73) Assignee: Big Dutchman International GmbH, Vechta (DE)

( * ) Notice: Subject to any disclaimer, the term of this patent is extended or adjusted under 35 U.S.C. 154(b) by 0 days.

(21) Appl. No.: 10/031,523

(22) PCT Filed: Jul. 6, 2000

(86) PCT No.: PCT/DE00/02221

§ 371 (c)(1),
(2), (4) Date: Jan. 17, 2002

(87) PCT Pub. No.: WO01/06846

PCT Pub. Date: Feb. 1, 2001

(30) Foreign Application Priority Data

Jul. 22, 2000 (DE) .................................. 299 12 821 U

(51) Int. Cl.[7] .................................................. A01K 1/10
(52) U.S. Cl. ...................................................... 119/61
(58) Field of Search ....................... 119/61, 52.1, 51.01, 119/74

(56) References Cited

U.S. PATENT DOCUMENTS

| | | | |
|---|---|---|---|
| 582,410 A | * | 5/1897 | Young |
| 3,653,362 A | * | 4/1972 | Davis ........................... 119/61 |
| 4,587,930 A | * | 5/1986 | Trego ........................... 119/61 |
| 5,031,575 A | * | 7/1991 | Phillips ....................... 119/61 |
| 5,275,131 A | | 1/1994 | Brake et al. ................. 119/63 |
| 5,596,946 A | * | 1/1997 | Bryant et al. .............. 119/52.1 |
| 5,791,286 A | * | 8/1998 | Taussig et al. ............ 119/52.2 |

FOREIGN PATENT DOCUMENTS

IT    MI930630    1/1995

OTHER PUBLICATIONS

CODAF: "Spiral Automatic Feeder–Trough", IT XP002152128, p. 3.

* cited by examiner

Primary Examiner—Charles T. Jordan
Assistant Examiner—Kimberly S Smith
(74) Attorney, Agent, or Firm—Collard & Roe, P.C.

(57) ABSTRACT

In a device for providing food to animals, comprising a feed supply and a bowl-like feeding basin serving for providing the supplied feed, the feeding basin comprising in about the center of the basin a cleaning opening that can be opened and closed by means of a closing element. The closing element is a part of the feeding basin that is placed in the cleaning opening in a flush or fitted manner, whereby both the closing element on its periphery and the feeding basin in the area of the edge compromise locking means which can be mutually actively engaged. The closing element can be fixed on or released from the feeding basin by means of said locking means both in the releasing and closing positions.

10 Claims, 4 Drawing Sheets

DEVICE FOR PROVIDING FOOD TO ANIMALS

CROSS REFERENCE TO RELATED APPLICATIONS

Applicants claim priority under 35 U.S.C. §119 of German Application No. 299 12 821.0 filed Jul. 22, 1999. Applicants also claim priority under 35 U.S.C. §120 of PCT/DE00/02221 filed Jul. 6, 2000. The international application under PCT article 21(2) was not published in English.

The invention relates to a device for providing food to animals, comprising a feed supply and a bowl-like feeding basin that serves for providing the supplied feed.

Devices of the type specified above are employed especially in poultry fattening operations. The great number of feeding bowls installed in a pen have to be cleaned regularly, which is carried out in a washing operation by means of flushing the bowls with spray water in most cases. In order to assure that the washing water will drain from the feeding bowl, the latter is designed in the form of a pendulum-type flap articulated on the device by means of a hinge or the like. In the position in which the feeding bowl is folded up for receiving the feed, it is maintained in that position with releasable locking means such as snap noses, clips or the like. The locking means are released for cleaning purposes, so that the feeding bowl is freely suspended on the fitting of the device, swinging about its pivot axle. With the feeding bowl in said position, the bowl can be cleaned in the installation site of the device, i.e. in the feeding station of the animals by spraying it off.

It has been found that cleaning by spraying with water poses problems because the freely pivoting feeding bowl is always capable of getting out of the way of the jet of water impinging upon it. Depending on the concentration and direction of the jet of spray water impacting it, the feeding basin will perform uncontrolled pivotal movements about its folding axle that even may lead to mechanical damage under certain circumstances. Such movements are undesirable because they obstruct or delay the cleaning process or are disadvantageous in some other ways. With an inwardly drawn edge of the feeding basin, which is present in most cases, residual water cannot drain off completely. As feeding bowls are disinfected as well, as a rule, there is the risk that a highly concentrated solution of disinfectant is adjusted after the residual water containing the chemicals used has dried, such chemicals being, for example dissolved. When such solutions containing harmful substances remain in a feeding basin, this may have adverse consequences for the health of the animals and thus finally for the consumer of meat and eggs as well.

The invention is based on the problem of designing a device of the type specified above in such a way that it can be cleaned when needed in a simple and optimal manner.

Said problem is solved according to the invention in that the feeding basin comprises a cleaning opening located in about the center of the feeding basin that can be opened or closed by means of a closing element.

As the opening is located in the center of the feeding basin, it is necessarily advantageously arranged in the deepest site of the feeding basin. In this way, when the closing element is released, i.e. when the opening is open, optimal drainage of the liquids used for cleaning the feeding basin mainly from the interior of the feeding basin is assured.

It is particularly advantageous that the closing element is a component of the feeding basin that is inserted in the opening in a flush and fitted manner. According to a further development of the invention, provision is made in this connection that both the closing element and the feeding basin comprise locking means that are located on the periphery of the closing element and on the feeding basin in the area of the edge of the latter. Such locking means can be caused to interact with each other and by means of which the closing element can be fixed on or detached from the feeding basin both in the releasing and closing positions.

With the closing element inserted in the opening of the basin, the feeding basin is complete and thus constitutes a closed component of the device serving the purpose of providing food.

When the locking means is released, the entire closing element, which forms a part of the bottom of the basin, can be removed, so that the opening is exposed. This means that optimal cleaning can be carried out on the site of installation because the closing element can be cleaned separately, if need be, and then inserted again in the feeding basin which has been cleaned as well, in order to form the bottom of the feeding basin after the locking means has been fixed again. For facilitating the cleaning operation as well as for enhancing the cleaning effect, provision is made that the closing element has a cone-shaped upward bulging in the center, with the foot of the cone ending in a surface area descending in the direction of the periphery of the closing element. The surface of the closing element thus has a shape that assures that cleaning water impinging upon the center drains off in the direction of the periphery of the closing element. No sharp corners and edges are present that would obstruct smooth drainage of the cleaning agent, in particular of spray water.

It is especially advantageous that the closing element and the cleaning opening are provided with a circular shape. This permits a simple manufacture and yet a fitted seating of the closing element in the opening.

According to a particularly advantageous further development of the invention, provision is made that the locking means comprise projections arranged on the periphery of the closing element, in such a manner that they project beyond the edge of the cleaning opening, as well as for recesses located on the edge of the cleaning opening, whereby each recess is dimensioned in such a way that the projections can be moved transversely in relation to the bottom of the basin while being guided in their associated recesses as soon as the closing element and the feeding basin. have been moved in relation to each other into positions in which the projections and the recesses correspond with one another. The circular shape described above has a favorable effect in this connection in that it is possible in the present case to use a simple rotational movement between the feeding basin and the closing element in order to fix the locking means against each other in a position of rotation, or to detach said locking means from each other in a second position of rotation, so that in said second position of rotation, the closing element can be lowered from the cleaning opening of the feeding basin or removed from said opening. After the cleaning operation, the closing element can be re-inserted in the opening, for example by lifting it, and rotated again into its closing position, in which the locking elements are re-engaged again with each other in their active locking positions. In the course of the lowering or lifting movement in the position of rotation described above, such movement is guided by the recesses, and the position of rotation cannot be changed as long as the projections are engaging the recesses in a guiding manner.

In order to keep the closing element in its opened position serving for cleaning purposes in continuing connection with the device so as to assure, for example that it cannot be lost, the device is characterized in that provision is made for catching elements for the opened closing element. Such catching elements prevent the detached or disengaged closing elements from dropping from the part of the feeding basin that remains connected with the device. The locking means in association with the catching elements are nonetheless capable of holding and fixing the closing element when it is detached from the basin, in such a way that its yielding to spray water, which is disadvantageous for the cleaning process, will not occur. In the course of the cleaning process, the closing element is kept fixed and supported in an adequately firm manner.

Each catching element may comprise an elevation arranged on the closing element and projecting into the feeding basin, with the projecting free end of such elevation comprising a catching nose extending beyond the edge of the opening into the feeding basin.

As soon as the closing element has been rotated in relation to the feeding basin into a position in which the recesses and the projections correspond with each other, the closing element could drop away from the feeding basin and fall down. After a defined distance of such a drop has been reached, the catching elements start to function in that the catching noses extending beyond the edge of the feeding basin act as stop means limiting any further distance of dropping.

The catching noses can be arranged both on the closing element and on the feeding basin. It is useful, however, if the catching elements are arranged on the closing element, whereby in particular the assembly to the closed, finished feeding basin is especially simplified in a particularly advantageous manner in that according to a further development of the invention, the catching elements are structural components in which the projections that have to be guided in the recesses on the edge of the feeding basin, are integrated at the same time.

In order to realize such an embodiment, provision is made according to the invention that each elevation is a radial rib set up on the surface section. The outer end of said rib is provided at the bottom, or in the zone of transition to the closing element, in the form of a projection, as well as in the form of a catching element at the top, or in the area projecting into the feeding basin. A front edge extending between the lower and the upper areas of the elevation present in the form of a radial rib can be designed and used in this connection as a guide means guiding the disengaged closing element as it is moving, until it reaches in the associated recess the opening position predetermined by the action of the catching element. Said recess is located on the edge of the opening. The catching nose of the catching element is located at the upper end of the front edge of the radial rib serving as the guide, and is dimensioned in such a way that it projects not only beyond the edge of the opening in the feeding basin, but continues to extend also across the bottom of its associated recess on the edge of the opening.

The feeding basin and the closing element are preferably molded parts made of plastic, in particular injection-molded parts. Each elevation and each configuration can be molded onto such plastic parts, which means that the manufacturing process can be carried out without problems on the industrial scale especially when such parts are produced in high numbers of units.

So that the activities required for carrying out the cleaning work can be facilitated, the feeding basin comprises adjustment aids for fixing the position of the closing element, which is movable in relation to the feeding basin and preferably can be moved by rotation. Such adjustment aids make it simpler to detach the closing element from the feeding basin by preferably turning it by hand into the respective position of rotation, or rotating it back again after the cleaning work has been completed until it is locked with the feeding basin.

Provision is made in this connection according to the invention that each adjustment aid is a stop that projects into the path described by the elevations of the closing element in the course of the relative rotational movement vis-a-vis the feeding basin. In the special embodiment of the invention specified above, it is thus the radial rib that is moved, with stops projecting into its path of movement in order to determine or fix the final positions of rotation of the closing element versus the feeding basin.

At least one of the stops can be designed in the form of a spring cam and/or equipped with slanted run-up surfaces. This permits turning the closing element also beyond a stop, if necessary, which may be required especially if blockage against rotating back is to be made possible not only in the released position as achieved by the guidance described above, but locking in the closing position between the two stops enclosing the radial rib in said position is to be achieved as well.

For said purposes, the invention makes provision for an embodiment in which each recess is located between a pair of stops set with a predetermined spacing between each other, whereby the third stop equipped with slanted flanks and/or designed in the form of a spring cam is additionally arranged between the stops belonging to the pair of stops, and whereby the recess is located between a stop belonging to the pair of stops and the additional third stop present in between said pair of stops.

An exemplified embodiment of the invention revealing further inventive features is shown in the drawing, in which.

Figure 2:
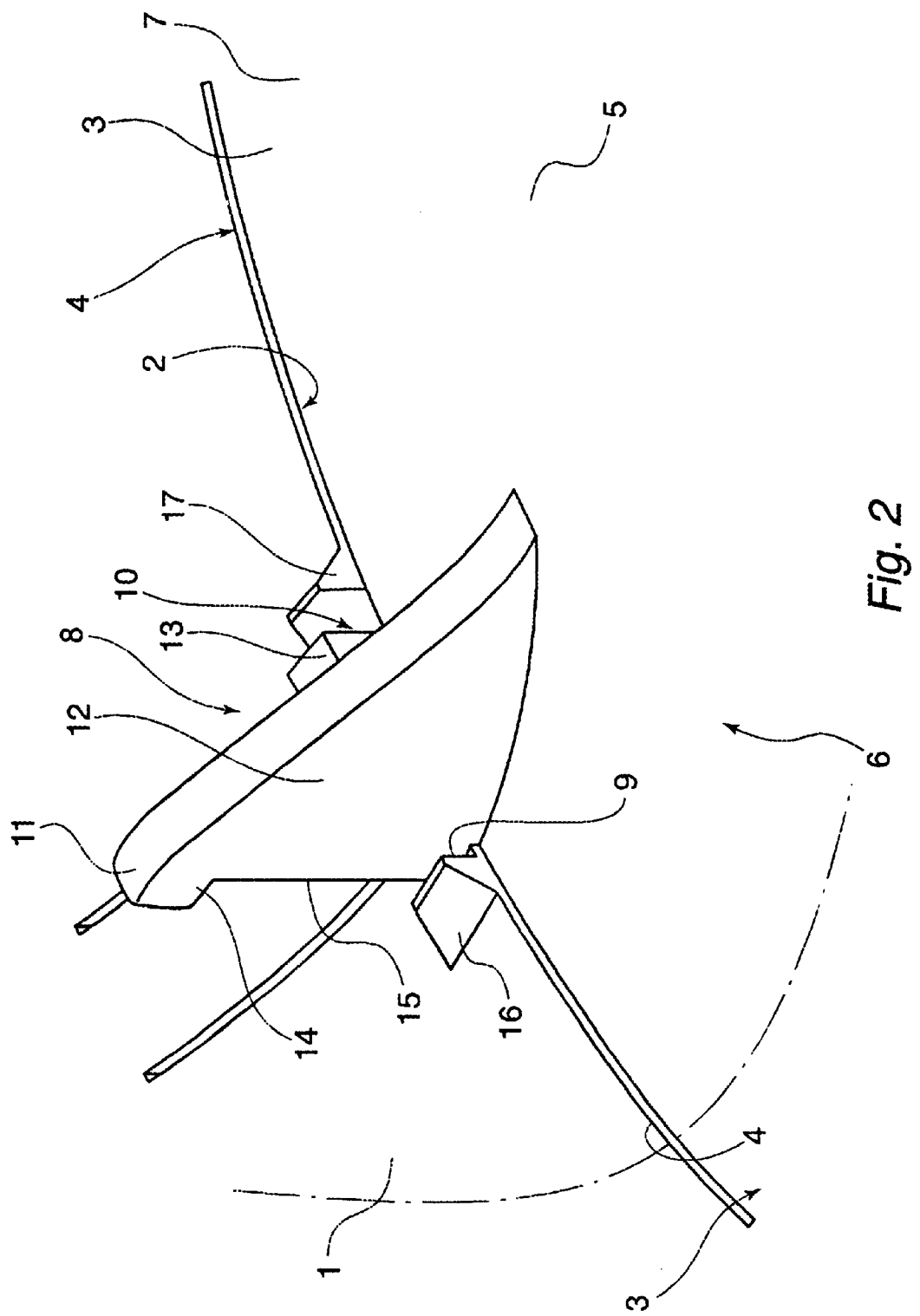
FIG. 2 is a view of a detail of the feeding basin according to FIG. 1 on an enlarged scale, whereby the closing element is in the closing position.
Figure 3:
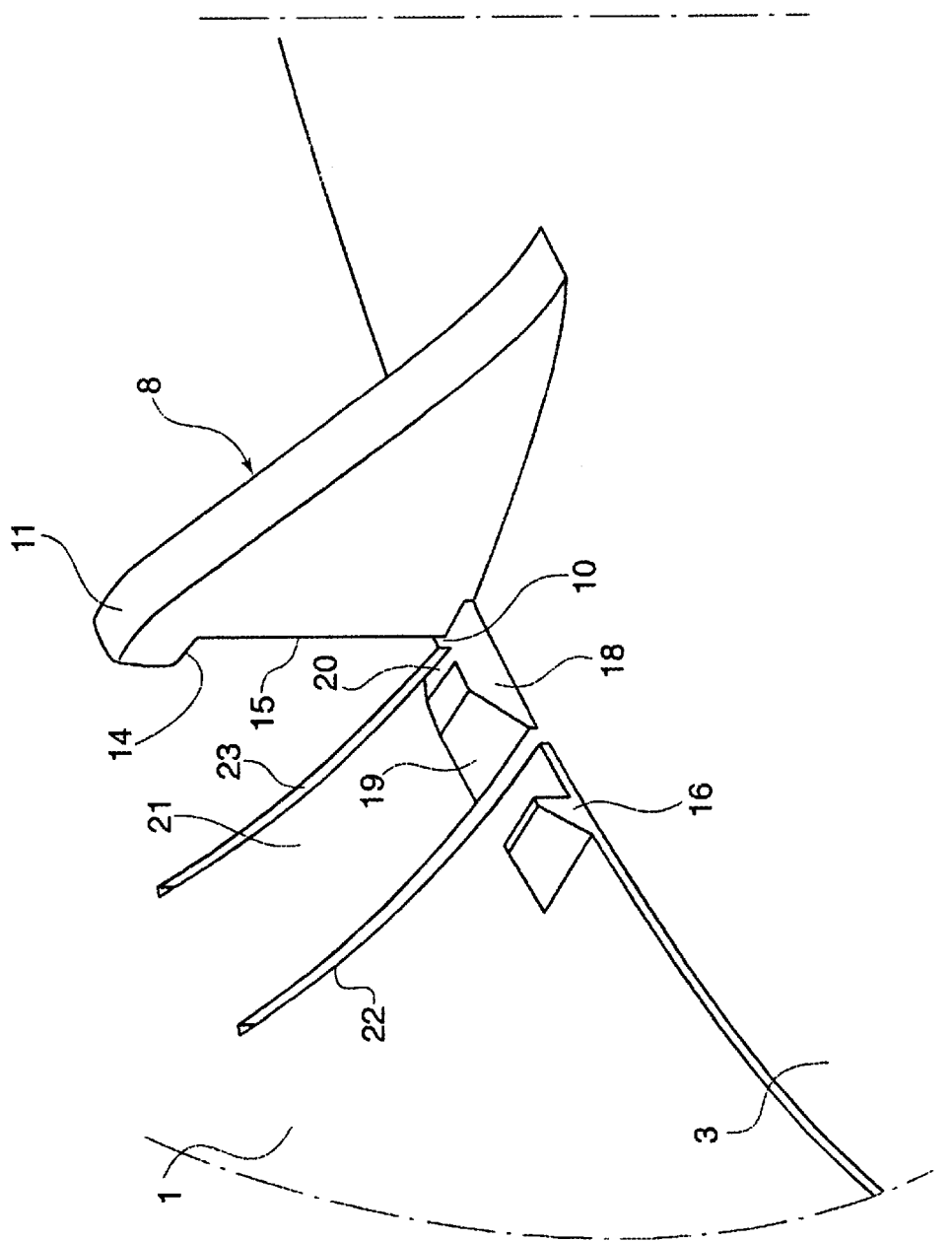
Figure 4:
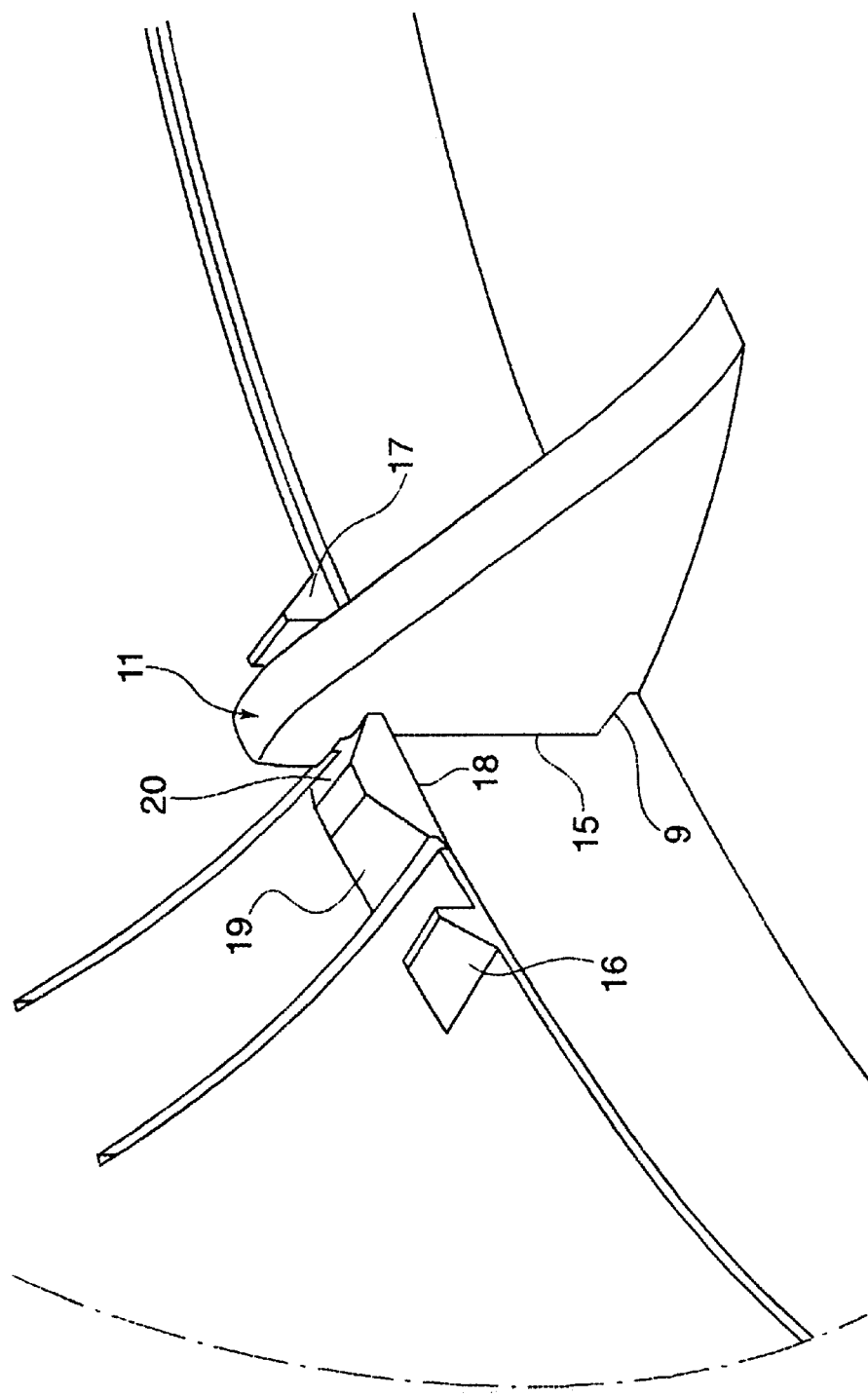

FIG. 3 shows the detail according to FIG. 2, but with the closing element in a position of rotation in which the initiation of the closing position according to FIG. 2 takes place, or the opening position of the closing element; and FIG. 4 is a view corresponding with FIG. 3 in which the closing element is present in the position opening the feeding basin, so that the feeding basin and the closing element can be subjected to a cleaning process.

Figure 1:
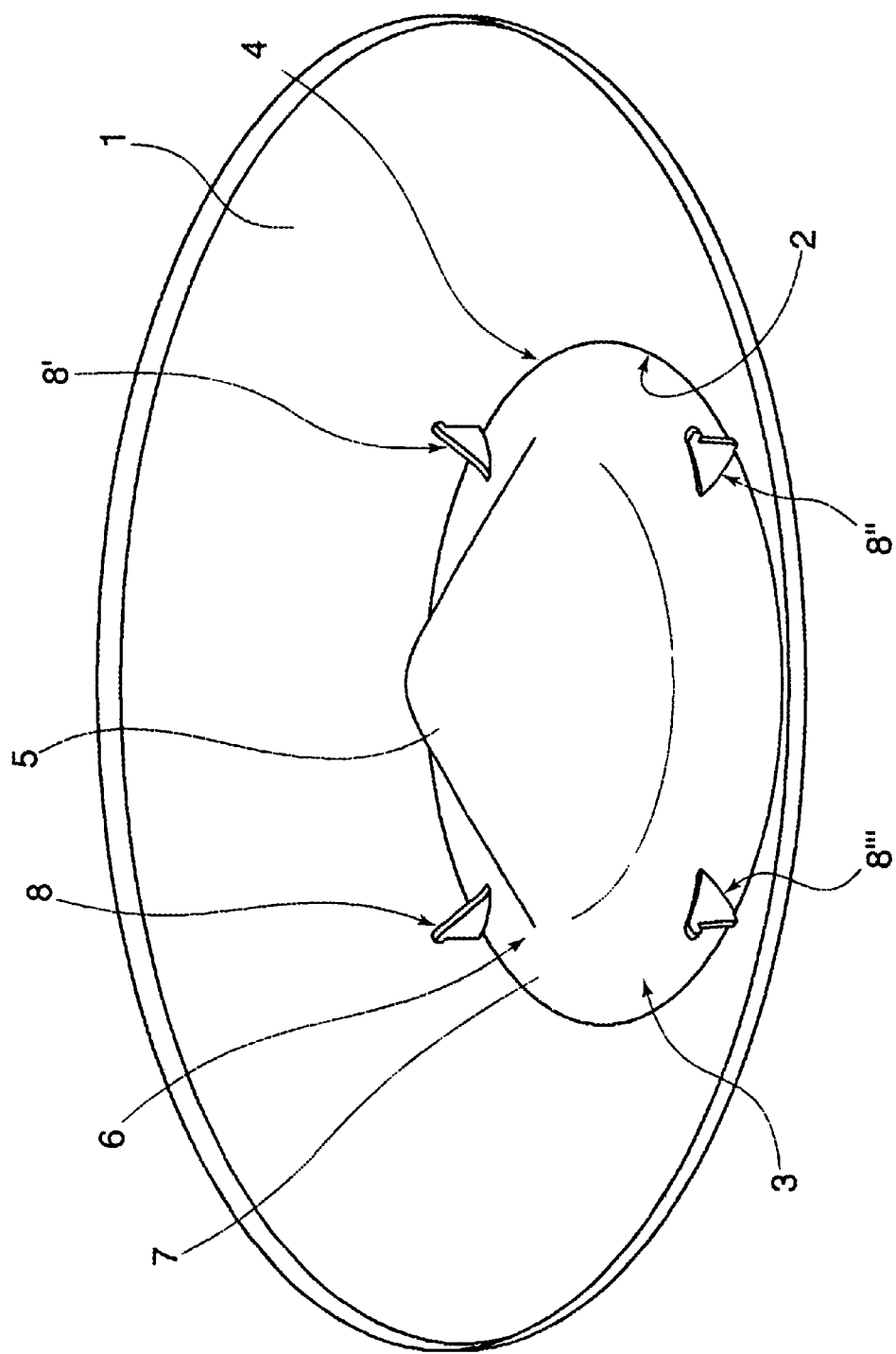
FIG. 1 is a view of a complete feeding basin from the top.

In FIG. 1, the feeding basin is shown by a perspective representation with a view of its interior.

The feeding basin 1 is molded in the form of a round bowl. A circular-opening is located in about the center of the feeding basin 1. The edge 2 of said opening is indicated by the circular line visible there. A closing element 3, which is shaped in a circular form as well, is seated in the opening in a flush and sealing manner. The periphery 4 or the outer circumference of the closing element 3 is designed in such a way that in the closing position shown here, the periphery 4 or an area located on the periphery 4 extends under the opening in the feeding basin 1, so that it is not possible to pull out or lift up the closing element in the upward direction into the feeding basin 1.

Like the feeding basin 1, the closing element 3 is made of plastic and forms a component of the feeding basin. When in its closing position, the closing element appears to be integrated in the feeding basin.

In its center, the closing element 3 comprises a cone-shaped upward bulging 5. The foot 6 of said cone ends in a surface segment 7 descending toward the periphery 4 of the closing element 3.

Both the closing element 3 and the feeding basin 1 comprise the locking means 8, which can be mutually actively engaged with each other and comprise a number of components and are located both on the periphery 4 of the closing element and on the edge 2 of the opening. In the present exemplified embodiment, the four locking means 8, 8', 8" and 8"' are present, which are uniformly distributed over the periphery 4, i.e. over the circumference of the closing element 3 and the edge 2 of the opening of the feeding basin 1, respectively.

FIG. 2 shows a view of a part of FIG. 1 on an enlarged scale, notably the part area of FIG. 1 where the locking means 8 is located. Identical structural components are denoted by the same reference symbols.

It is clearly shown in FIG. 2 that each locking means 8 comprises the projections 9, to begin with. Said projections are arranged on the periphery 4 of the closing element 3 in such a way that they can project beyond the edge 2 of the cleaning opening in the feeding basin 1. Furthermore, each locking means 8 comprises the recesses 10, which are located on the edge 2 of the cleaning opening in the feeding basin 1. Each recess 10 is dimensioned in such a way that the projections 9 can be moved transversely in relation to the feeding basin 1 while being guided in the recesses 10 associated with it, as soon as the closing element 3 and the feeding basin 1 have been moved into positions relative to each other. When in such positions, the projections 9 and the recesses 10 correspond with one another. As the closing element 3 could drop out of the feeding basin 1 downwards when it is in said position—which is shown in FIG. 3—because the projections 9 no longer rest on the edge 2, as it is indicated in FIG. 4, provision is made for the catching elements 11. Said elements comprise elevations in the form of the radial ribs 12, which are arranged on the closing element 3 and project into the feeding basin 1. The projecting free ends of said elevations comprise the catching noses 14 that extend beyond the bottom 13 of the associated recess 10 on the edge 2 of the opening in the feeding basin 1.

FIG. 2 shows that it is particularly advantageous that the catching elements 11 and the projections 9 are combined as a component of the locking means 8, 8', 8", 8"' in one structural part, notably of the elevation formed by the radial rib 12. Said rib can be simply molded onto the closing element 3.

A front edge 15 extending between the lower and upper areas of the elevation present in the form of the radial rib 12 is designed as a guide means, which guides the released closing element 3 in the associated recess 10 located in the edge 2 of the cleaning opening as the closing element is moving into the opening position (see FIG. 4). Said position is predetermined by the action of the catching elements 11.

The locking means 8, 8', 8", 8"', furthermore, comprise adjusting aids located on the feeding basin 1 for fixing the position of the closing element 3, which can be moved in relation to the feeding basin 1 and is preferably movable by rotation. Each adjusting aid is a stop 16 and, respectively, 17, which projects into the path, preferably into the path of rotation described by the elevation present in the form of the radial rib 12 when relatively moving or rotating vis-à-vis the feeding basin 1.

As shown in FIGS. 3 and 4, provision is still made for a third stop 18, which comprises the slanted run-up flanks 19 and 20 and, furthermore, performs the function of a spring cam in that it is arranged on a wall segment 21 of the feeding basin. Said wall segment is laterally defined by the two sectional joints 22 and 23, which extend radial and parallel with each other from the edge 2 of the opening. The sectional joints make it possible for the wall segment 21 to elastically yield in the downward direction as soon as the projection 9 of the locking means 8 is guided across the slanted flanks 19 and, respectively, 20, as the closing element 3 is rotationally moving vis-à-vis the feeding basin 1.

It is clearly shown in FIG. 4 that each recess 10 is located between a pair of the stop means 16 and 17, which have a predetermined spacing between each other, whereby the third stop 18, which is equipped with the slanted flanks 19, 20 and designed in the form of a spring cam, is additionally arranged between the stops 16 and 17 forming the pair of stops. The recess 10 is located between the stop 17 of the pair of stops and the third stop 18 located in between.

What is claimed is:

1. A device for feeding animals with fodder, comprising:
   a fodder supply;
   a bowl-shaped feeding dish for making the supplied fodder available and having a cleaning passage in a central area of the dish;
   a closing element for releasing and closing the cleaning passage, said closing element formed from a part of the feeding dish fitting flush in the cleaning passage; and
   locking means present on both a periphery of the closing element and also on the feeding dish in an edge area, said locking means being mutually actively engageable and by means of which the closing element can be fixed on and detached from the feeding dish, wherein the closing element has a cone-shaped outward bulge in a central area, said cone-shaped bulge having a foot ending in a segment of a surface descending towards the periphery of the closing element; and wherein the closing element and the passage have a circular shape, said locking means comprising:
   (a) projections arranged on the periphery of the closing element in such a way that said projections protrude beyond an edge of the cleaning passage; and
   (b) recesses disposed on an edge of the cleaning passage; wherein each recess corresponds to one of the projections is dimensioned so that each projection car be moved transversely in relation to the dish with guidance by the associated recess as soon as the closing element and the feeding dish are moved into a position relative to each other in which the projections and the recesses correspond wish one another; and
   a plurality of catching elements arranged on the closing element.

2. The device according to claim 1, wherein each catching element comprises an elevation arranged on the closing element and projecting into the feeding dish, with a free end of said elevation comprising a catching nose extending over a bottom of the respective recess in the edge of the cleaning passage of the feeding dish.

3. The device according to claim 2, wherein each elevation has a radial rib placed on a surface section, with an outer end of said rib being provided in a transition zone to the closing element in the form of a projection, and a catching element in an area projecting into the feeding dish.

4. The device according to claim 2, wherein the feeding dish and the closing element are injection-molded parts made of plastic, and wherein each elevation is molded onto the closing element.

5. The device according claim 2, wherein a front edge extending between lower and upper areas of the elevation is designed as a guide means for guiding the closing element as said closing element moves into an opening position in an associated recess located in the edge of the cleaning opening, such opening position being predetermined by actions of the catching elements.

6. The device according to claim 2, wherein the feeding dish comprises adjustment aids for fixing the position of the closing element in relation to the feeding dish.

7. The device according to claim 6, wherein each adjustment aid is a stop projecting into a path defined by the elevations of the closing element as the said closing element moves relative to the feeding dish.

8. The device according to claim 7, wherein at least one of the stops is a spring cam.

9. The device according to claim 7, wherein at least one of the stops is equipped with slanted run-up flanks.

10. The device according to claim 9, wherein each recess is arranged between a pair of stops arranged with a predetermined spacing from each other, wherein the stop with slanted run-up flanks is additionally arranged as a third stop between the pair of stops; and wherein each recess is arranged between one of the pair of stops and the additional third stop.

\* \* \* \* \*

UNITED STATES PATENT AND TRADEMARK OFFICE
CERTIFICATE OF CORRECTION

PATENT NO. : 6,539,893 B1
DATED : April 1, 2003
INVENTOR(S) : Friedrich Otto-Lübker et al.

It is certified that error appears in the above-identified patent and that said Letters Patent is hereby corrected as shown below:

<u>Title page,</u>
Item [30], Foreign Application Priority Data, correctly should read:

-- July 22, 1999      (DE) ……………….. 299 12 821 --.

Signed and Sealed this

Ninth Day of September, 2003

JAMES E. ROGAN
*Director of the United States Patent and Trademark Office*